(12) United States Patent  
Jenssen

(10) Patent No.: US 8,485,674 B2  
(45) Date of Patent: Jul. 16, 2013

(54) SEMI TRUCK SIDE VIEW MIRROR ROAD SPRAY CONTAMINATION DEFLECTOR

(76) Inventor: Jill Anne Jenssen, Sarasota, FL (US)

( * ) Notice: Subject to any disclaimer, the term of this patent is extended or adjusted under 35 U.S.C. 154(b) by 141 days.

(21) Appl. No.: 12/932,263

(22) Filed: Feb. 22, 2011

(65) Prior Publication Data

US 2011/0216410 A1    Sep. 8, 2011

Related U.S. Application Data

(60) Provisional application No. 61/309,520, filed on Mar. 2, 2010.

(51) Int. Cl.
*G02B 5/08* (2006.01)
*B60R 1/06* (2006.01)

(52) U.S. Cl.
USPC .......................................... 359/844; 359/507

(58) Field of Classification Search
USPC ........................................................ 359/844
See application file for complete search history.

(56) References Cited

U.S. PATENT DOCUMENTS 3,644,021 A * 2/1972 Hamby ..................... 359/854
2007/0244254 A1 * 10/2007 Abraham et al. ............... 525/98

* cited by examiner

*Primary Examiner* — Jade R Chwasz

(57) ABSTRACT

A semi truck side view mirror road spray contamination deflector for use on such vehicles using a side view mirror in conjunction with a separate convex spot mirror. The deflector is comprised of a rigid, weatherproof shield with a pliable weatherstripping attached, that when mounted horizontally, bridges the gap between the two mirrors, effectively redirecting the airflow thus eliminating road spray and excess moisture from creeping up the back of the spot mirror and splashing onto the upper mirrors reflective surface.

3 Claims, 4 Drawing Sheets

SEMI TRUCK SIDE VIEW MIRROR ROAD SPRAY CONTAMINATION DEFLECTOR

CROSS REFERENCE TO RELATED APPLICATIONS

Not Applicable

STATEMENT REGARDING FEDERALLY SPONSORED RESEARCH and DEVELOPMENT

Not Applicable

REFERENCE TO A SEQUENCE LISTING, A TABLE, OR A COMPUTER PROGRAM

Not Applicable

BACKGROUND OF THE INVENTION

1. Field of the Invention

The present invention relates to devices that prevent the accumulation of road spray contamination on the side view mirror of a motor vehicle, but more particularly to such a device that includes a horizontal deflector that prohibits the flow of air from carrying the road spray upward from the attached spot mirror and onto the reflective surface of the main side view mirror.

2. Description of Prior Art

Side view mirrors such as the type utilized on large trucks are not only required by law, but are the only effective means for a driver to observe traffic and other related conditions on either side or to the rear of the vehicle. Due to the location these mirrors are positioned, during inclement weather a tendency arises for the reflective surfaces to accumulate a film that is virtually impossible to see through. This is the very time when the use of the mirrors is more critical than ever, and while periodic cleaning of the mirrors when parked, can ensure good visibility under normal conditions, it is difficult, unsafe, and impractical for a driver to keep the surface of the side mirrors clean while the vehicle is in motion. In an effort to alleviate this problem for drivers, several devices for cleaning the reflective surface of the side view mirror have been created. A few devices attempt to force the contamination off the surface by directing a stream of air across the mirror face, such as those assigned U.S. Pat. Nos. 4,248,497 and 4,134,612 while another, U.S. Pat. No. 4,550,988, attempts to actually wash the surface with an elaborate water spraying mechanism. Such prior art devices known to this inventor that only attempt to remove the contamination once it has accumulated, tend to reduce a drivers field of view, are complex, expensive, and less than effective, therefore creating a need for a simple, unobtrusive deflector that successfully prevents contamination from ever reaching the mirrors surface.

SUMMARY OF THE INVENTION

The present invention is a device configured and designed to be utilized on a set of mirrors as is customarily found on modern day semi trucks. The road spray contamination deflector is horizontally positioned under the large main mirror and utilizes the existing threaded mounting bolt of such as a means for its own attachment, thereby eliminating bulky brackets or hole drilling which could compromise the structural integrity of the vehicle. The deflector should be positioned in such a way so as to have the rubber weatherstripping that is along its leading edge, firmly seated against the rear side of the adjoining convex spot mirror, thereby creating the means with which to stop road spray contamination from reaching the reflective surface of the aforementioned main mirror.

DESCRIPTION OF THE PREFERRED EMBODIMENT

Figure 1:
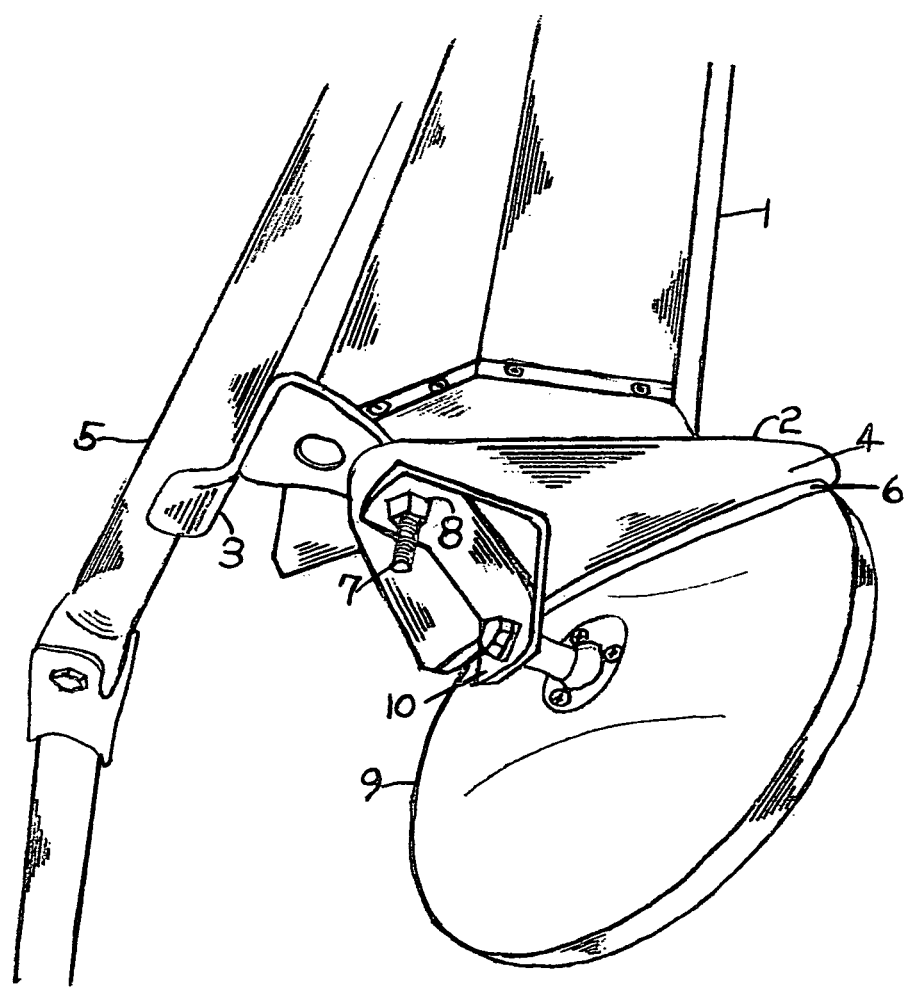
FIG. 1 is a lateral elevation illustrating the road spray contamination deflector mounted in the preferred position under the truck's main mirror, securely fastened, and seated up against the convex spot mirror.
Figure 2:
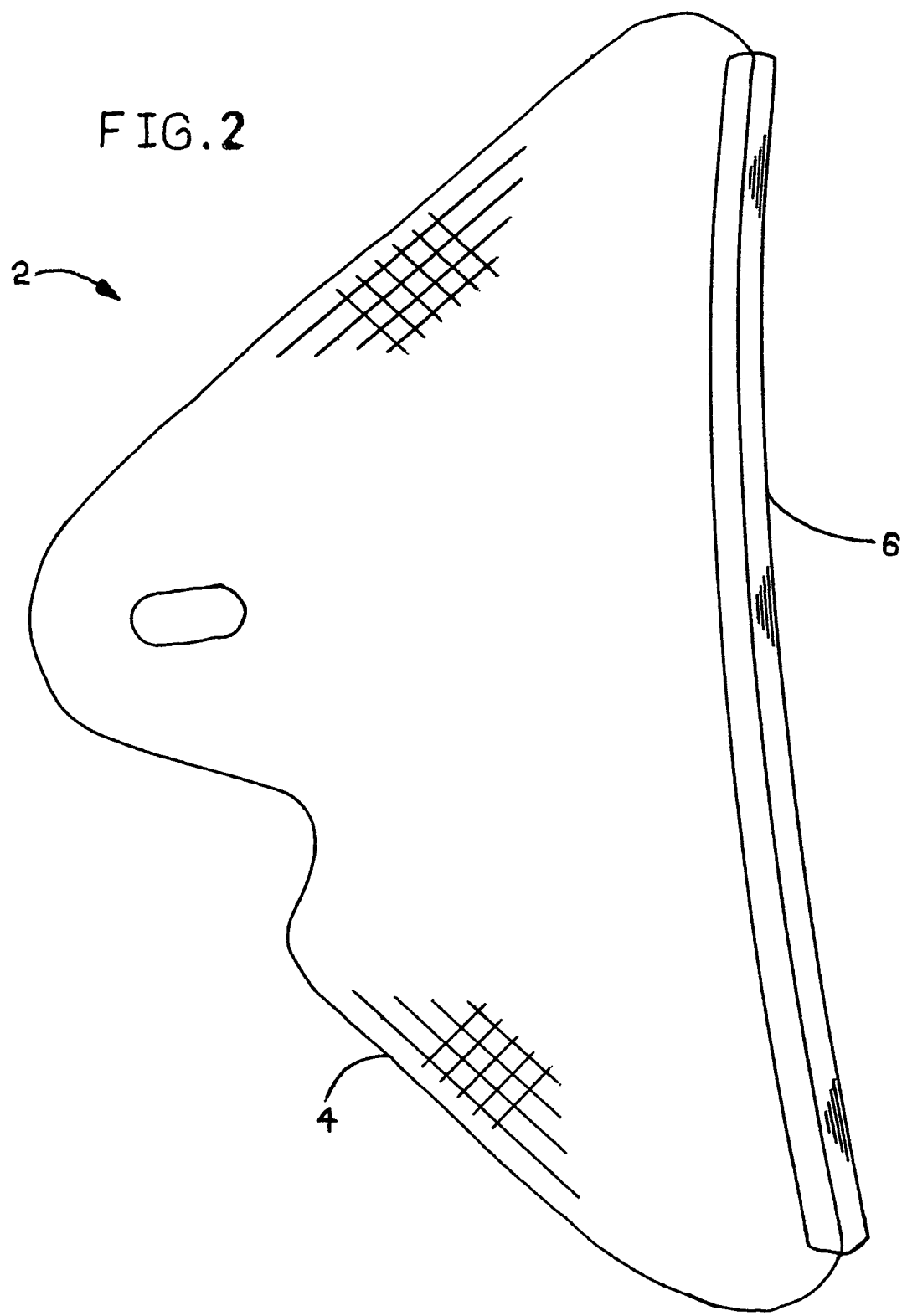
FIG. 2 is a horizontal plane view of the shield and weatherstripping components assembled together as to form the deflector.
Figure 3:
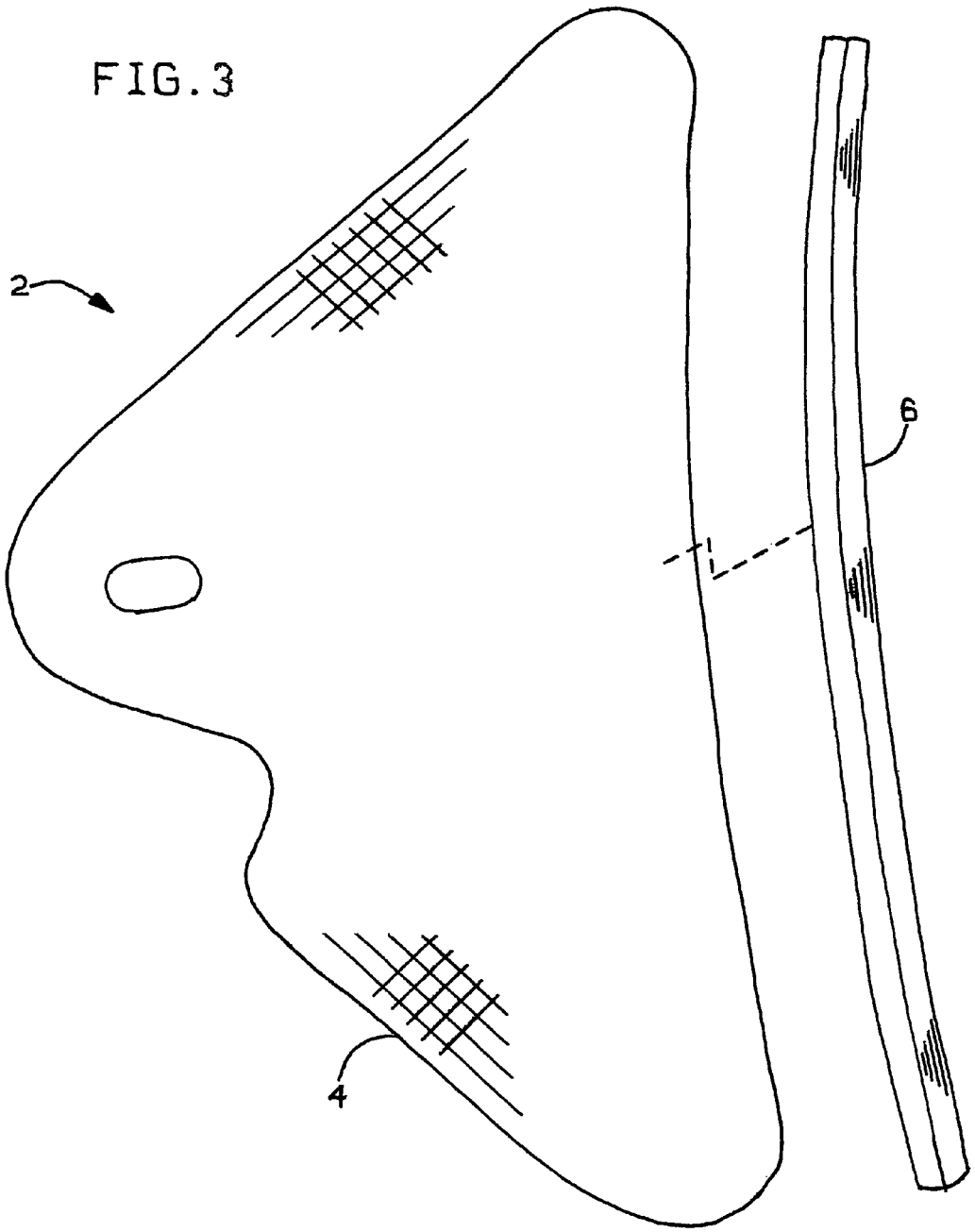
FIG. 3 is a horizontal plane view of the shield and weatherstripping components as individual parts, respectively.
Figure 4:
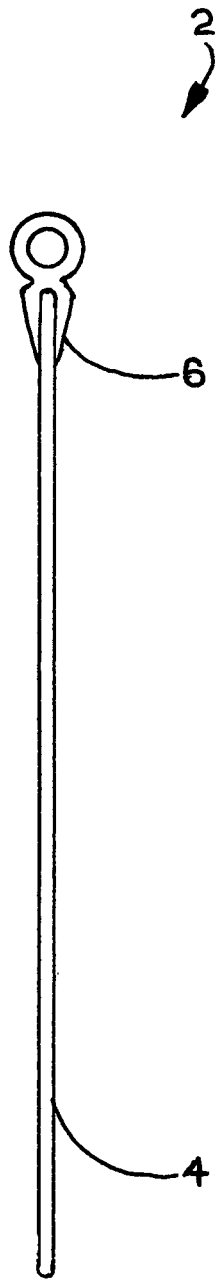
FIG. 4 is a vertical plane view of the shield and weatherstripping components assembled together as to form the deflector.
Figure 5:
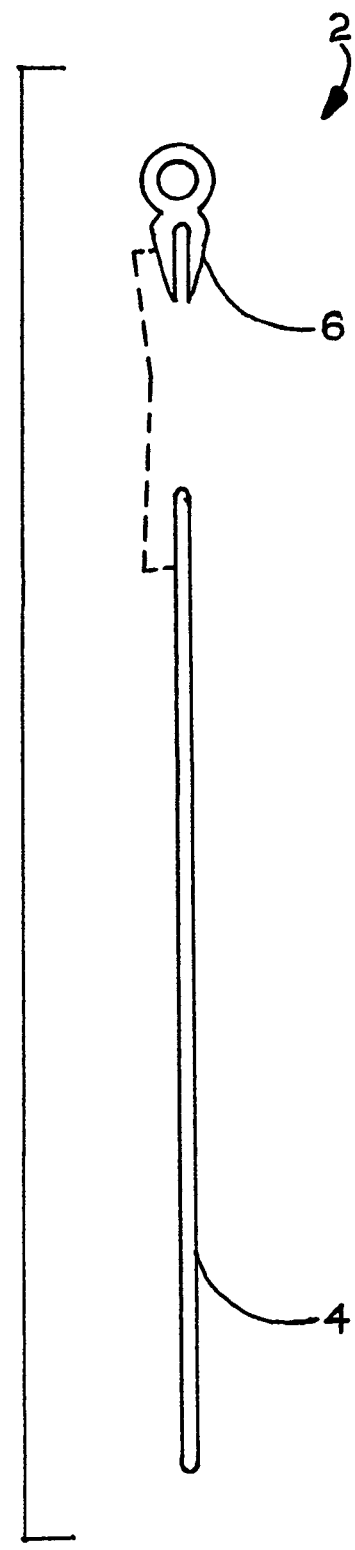
FIG. 5 is a bracketed vertical plane view of the shield and weatherstripping components as individual parts, respectively.

Illustrated in FIG. 1 is a partial view of a modern semi trucks side view mirror assembly that is easily recognizable by a person skilled in the field. This view is comprised of the main mirror, designated by numeral 1, that is connected to the welded flange 3, of the U-shaped mounting bracket 5, buy means of a threaded bolt 7, and an aero nut 8. The threaded bolt 7, which is manufactured as a part of the main mirror 1, is also responsible for securing the convex spot mirror 9 and its bracket 10 to the aforementioned mirror 1. It is this configuration of threaded bolt 7, aero nut 8, and spot mirror bracket 10 that creates a solid and efficient location on which to mount the present invention 2, which is comprised of a rigid shield 4 and a piece of weatherstripping 6. By means of having the weatherstripping 6 seated firmly against the rear surface of the convex spot mirror 9, the deflector 2 redirects the air flow downward, thus negating any upward travel of road spray that would normally deflect off the top of the spot mirror 9 and contaminate the reflective surface of the main mirror 1. It should be apparent from the foregoing description of the preferred embodiment that a novel road spray contamination deflector has been provided which is relatively inexpensive to manufacture and which can be as easily incorporated onto new vehicles at the factory as it is to install by owners of existing equipment out in the field. The desired outcome of which is safer roadways due to reduced driver fatigue during inclement weather conditions.

The invention claimed is:

1. A road spray contamination deflector for use on a semi truck having a side view mirror/convex spot mirror combination, whereas said road spray contamination deflector comprising an air and road spray deflection shield being formed of a rigid, weatherproof material in conjunction with a length of pliable, waterproof material secured along a leading planar edge of said shield is mounted horizontally under said side view mirror and engages the rear side of said convex mirror creating a moisture barrier which redirects the airflow downward, thus negating any upward travel of road spray that would otherwise deflect off the top of said spot mirror and contaminate the reflective surface of said side view mirror.

2. A road spray contamination deflector as set forth in claim one whereas said road spray deflection shield having an oblong mounting hole set proportionately behind said leading planar edge so as to facilitate said horizontal attachment of said road spray contamination deflector by means of said side view mirrors factory installed threaded nut and bolt providing for both pivotal and proportionate placement with relation to said convex mirror.

3. A road spray contamination deflector as set forth in claims one whereas said length of pliable waterproof material secured along said leading planar edge of said road spray deflection shield is a manufactured form of weatherstripping incorporating an embedded U shaped channel of pliant metal fused to a flexible tube-like round bulb so as to be crimped lengthwise along said leading planar edge of said road spray deflection shield thereby creating said semi truck side view mirror road spray contamination deflector.

* * * * *